(12) United States Patent
    Chung

(10) Patent No.: US 8,309,880 B2
(45) Date of Patent: Nov. 13, 2012

(54) COATING LAYER REMOVING APPARATUS AND METHOD FOR THE SAME

(75) Inventor: I-Feng Chung, Hsinchu (TW)

(73) Assignee: Phoenix Silicon International Corporation, Hsinchu (TW)

( * ) Notice: Subject to any disclaimer, the term of this patent is extended or adjusted under 35 U.S.C. 154(b) by 414 days.

(21) Appl. No.: 12/696,504

(22) Filed: Jan. 29, 2010

(65) Prior Publication Data

US 2011/0186553 A1    Aug. 4, 2011

(51) Int. Cl.
    *B23K 26/36*    (2006.01)
    *H01M 4/139*    (2010.01)
(52) U.S. Cl. ......... 219/121.62; 219/121.68; 219/121.69; 219/121.84; 429/209
(58) Field of Classification Search ............. 219/121.68, 219/121.69, 121.78, 121.84; 228/212, 247; 29/623.1; 429/128, 209
    See application file for complete search history.

(56) References Cited

U.S. PATENT DOCUMENTS

| | | | | |
|---|---|---|---|---|
| 1,919,275 A | * | 7/1933 | Dunham | 198/404 |
| 4,675,497 A | * | 6/1987 | Pearl et al. | 219/121.67 |
| 5,038,016 A | * | 8/1991 | Robertson et al. | 219/121.83 |
| 5,334,280 A | * | 8/1994 | Anthony et al. | 216/65 |
| 5,614,115 A | * | 3/1997 | Horton et al. | 219/121.67 |
| 6,160,835 A | * | 12/2000 | Kwon | 372/108 |
| 2002/0029711 A1 | * | 3/2002 | D'Amato | 101/467 |
| 2002/0183181 A1 | * | 12/2002 | Hayashi et al. | 493/194 |
| 2005/0079418 A1 | * | 4/2005 | Kelley et al. | 429/231.95 |

FOREIGN PATENT DOCUMENTS

| | | | |
|---|---|---|---|
| JP | 55037947 A | * | 3/1980 |
| JP | 05314985 A | * | 11/1993 |
| JP | 95113611 B2 | * | 12/1995 |

* cited by examiner

*Primary Examiner* — Samuel M Heinrich
(74) *Attorney, Agent, or Firm* — Rosenberg, Klein & Lee

(57) ABSTRACT

The present invention discloses a coating layer removing apparatus and a method for the same. The apparatus of the present invention comprises a transport device displacing an electrode plate; a laser device having a laser head arranged above the displacement path of the electrode plate; and a control center electrically connected to the transport device and the laser device. The method of the present invention comprises mounting an electrode plate on the transport device; using the control center to set the speed of displacing the electrode plate, and program the time interval, count and penetration depths of the laser beams; and using the device of the present invention to form exposed areas equidistantly on the electrode plate. The apparatus of the present invention automatically removes a coating layer with a laser beam without directly contacting the electrode plate. Therefore, the present invention can fast form exposed areas of high quality.

16 Claims, 8 Drawing Sheets

COATING LAYER REMOVING APPARATUS AND METHOD FOR THE SAME

BACKGROUND OF THE INVENTION

1. Field of the Invention

The present invention relates to an apparatus to fabricate the electrode plate of a lithium battery, particularly to a coating layer removing apparatus and a method for the same, which can reduce the fabrication time and promote the yield rate.

2. Description of the Related Art

Lithium batteries have advantages of high energy density, compactness, environmental protection and combination ability. Therefore, lithium batteries have been widely used in many fields. With the increasing usage, more and more manufacturers invest in the technical development of lithium batteries.

Although the lithium battery has a very large market share, the fabrication speed thereof is hard to increase. The productivity of lithium batteries is limited by the fabrication of the electric-conduction tab and the electrode plate of the conventional electrode roll. Refer to FIG. 1. The electrode plate 100 may be a positive or negative electrode plate and comprises a substrate 110 and two coating layers 120 and 130 respectively formed on two surfaces of the substrate 110. An electric-conduction tab 150 is soldered to a region of the substrate 110, which is exposed from the electrode plate 100. To increase the electricity storage within the original volume, the exposed area 140 where the electric-conduction tab 150 is joined to the electrode plate 100 should be as small as possible. In other words, the closer the exposed area 140 to the area of the electric-conduction tab 150, the higher the electricity storage of a lithium battery.

The abovementioned scheme is ideal in theory but hard to realize in practice. Because the electrode plate 100 is very thin, removing the coating layers 120 and 130 to expose the substrate 110 is usually undertaken manually, which is laborious and time-consuming. Further, a slightly greater force applied by the worker may damage the very thin substrate 110. In fact, either too great or too small a force applied by the worker would affect the quality and the discharging capability of the lithium battery.

Both the coating layers 120 and 130 must be partially removed to form the exposed areas 140. However, the conventional technology can only remove a single coating layer 120 or 130 in one cycle. In other words, at least two cycles of operation are needed to form the exposed areas 140 of a single electrode plate 110. Therefore, the manufacturers have to invest more manpower and capital to produce lithium batteries, which reduces the competitiveness of the Taiwan lithium battery manufacturers.

A Taiwan patent of application No. TW096116856 disclosed an apparatus to solve the abovementioned problem, which simultaneously heats specialized areas of the upper and lower surfaces of the electrode plate 100 and then applies a solvent to the coating layers 120 and 130 inside the heated areas. The coating layers 120 and 130 are softened and expanded by the solvent and then separated from the substrate 110. The softened coating layers 120 and 130 are mechanically removed with a scraper or a file to form the exposed areas 140 on the electrode plate 100. The prior-art patent can fast and economically fabricate the positive and negative electrode plates 100 with reliable quality.

We should admit that the Taiwan patent of application No. TW096116856 provides automatic fabrication and solves the low-productivity problem resulting from manually removing the coating layers 120 and 130 of the electrode plate 100. The prior art can obtain the exposed areas 140 with the same depth in theory. However, the variation of the thickness of the coating layers 120 and 130, the extent of heating, the extent of solvent etching and the variation of the force applied to scrape off the coating layers 120 and 130 affect the removal of the coating layer 120 and 130, in practice. Thus, the damage rate of the electrode plates 100 is still high, and the yield and quality is still unstable, in the prior art. Therefore, the competitiveness promoted by the prior art is limited.

Accordingly, the present invention proposes a coating layer removing apparatus and a method for the same to overcome the abovementioned problems.

SUMMARY OF THE INVENTION

The primary objective of the present invention is to provide a coating layer removing apparatus and a method for the same, which use laser to remove the coating layers on the surfaces of an electrode plate, whereby is improved the damage rate of the substrate of the electrode plate and promoted the quality and yield of the products.

Another objective of the present invention is to provide a coating layer removing apparatus and a method for the same, which form the exposed areas on both the upper and lower surfaces of an electrode plate in a single cycle, and which favor the mass-production of lithium batteries, reduce the fabrication cost, and promote the competitiveness of the manufacturers.

To achieve the abovementioned objectives, the present invention proposes a coating layer removing apparatus, which comprises a transport device, a laser device and a control center. The transport device displaces an electrode plate. The laser device has a laser head arranged over the displacement path of the electrode plate. The laser head of the laser device emits a laser beam to hit the electrode plate. Because the electrode plate has coating layers on both surfaces, the coating layer hit by the laser beam is removed to expose the substrate and form an exposed area. The control center electrically connects with the transport device and the laser device to control the speed at which the transport device displaces the electrode plates, the timing at which the laser device emits laser beams, the count of the laser beams, and the penetration depths of the laser beams.

The present invention also proposes a coating layer removing method, which comprises steps: setting the displacement speed and stop positions of the electrode plate into the control center; inputting the time interval between two laser beams, the count of the laser beams, and the penetration depths of the laser beams; using the coating layer removing apparatus of the present invention to automatically form the exposed areas on the surfaces of the electrode plate according to the input conditions.

Below, the embodiments are described in detail in cooperation with the attached drawings to demonstrate the present invention and make easily understood the objectives, technical contents, characteristics and accomplishments.

DETAILED DESCRIPTION OF THE INVENTION

Figure 1:
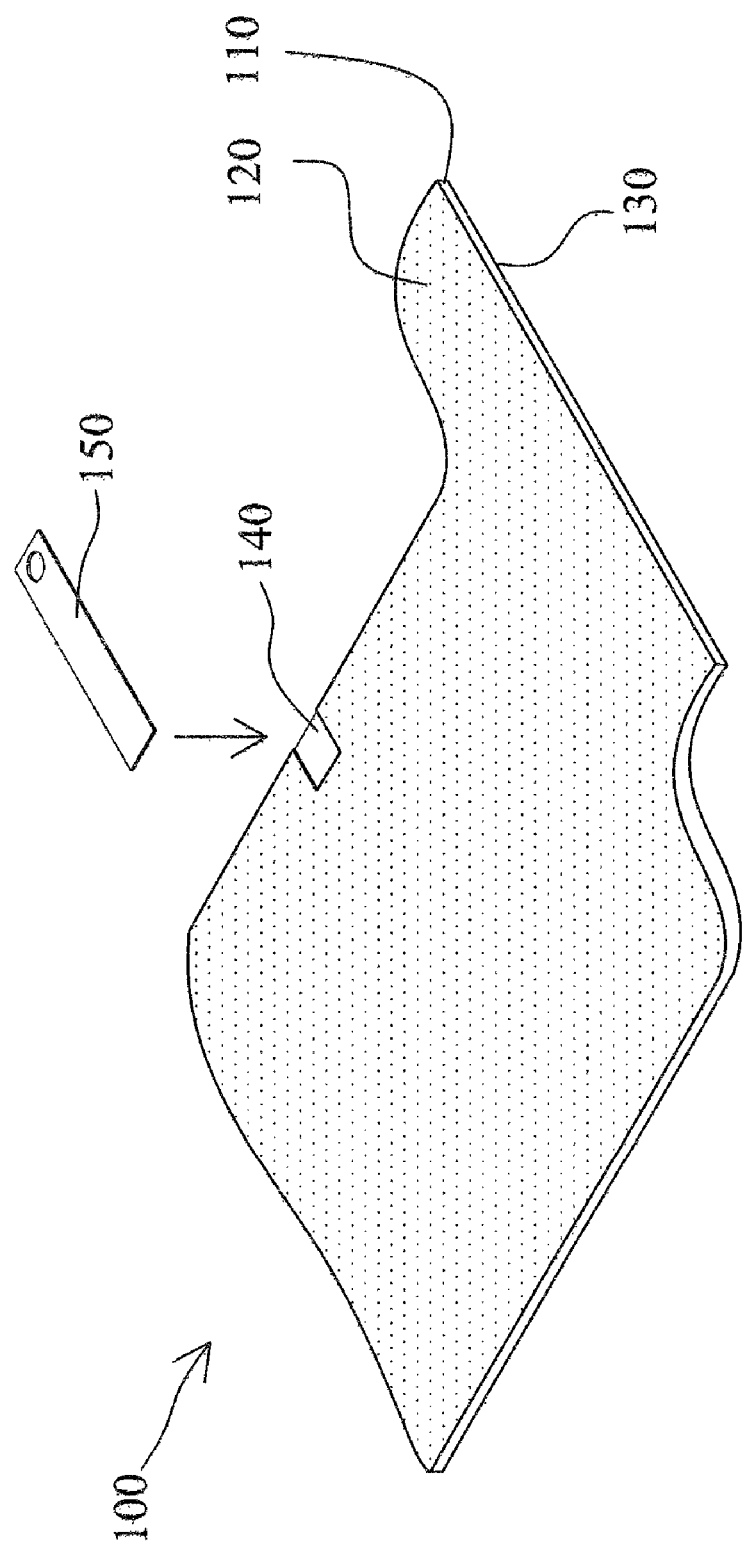
FIG. 1 is a diagram schematically showing an electrode plate of a conventional electrode roll.
Figure 2:
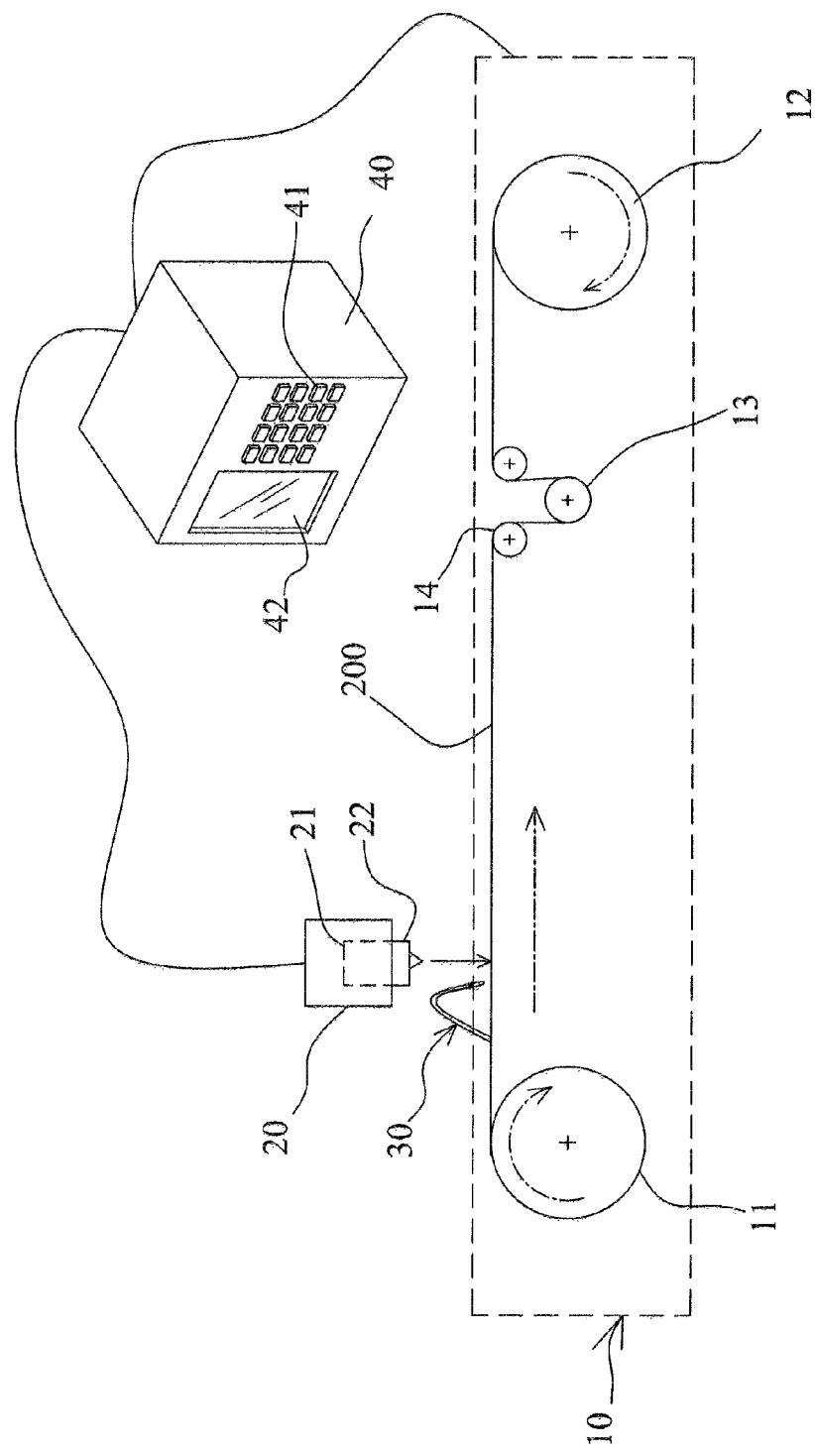
FIG. 2 is a diagram schematically showing a coating layer removing apparatus according to one embodiment of the present invention.
Figure 3:
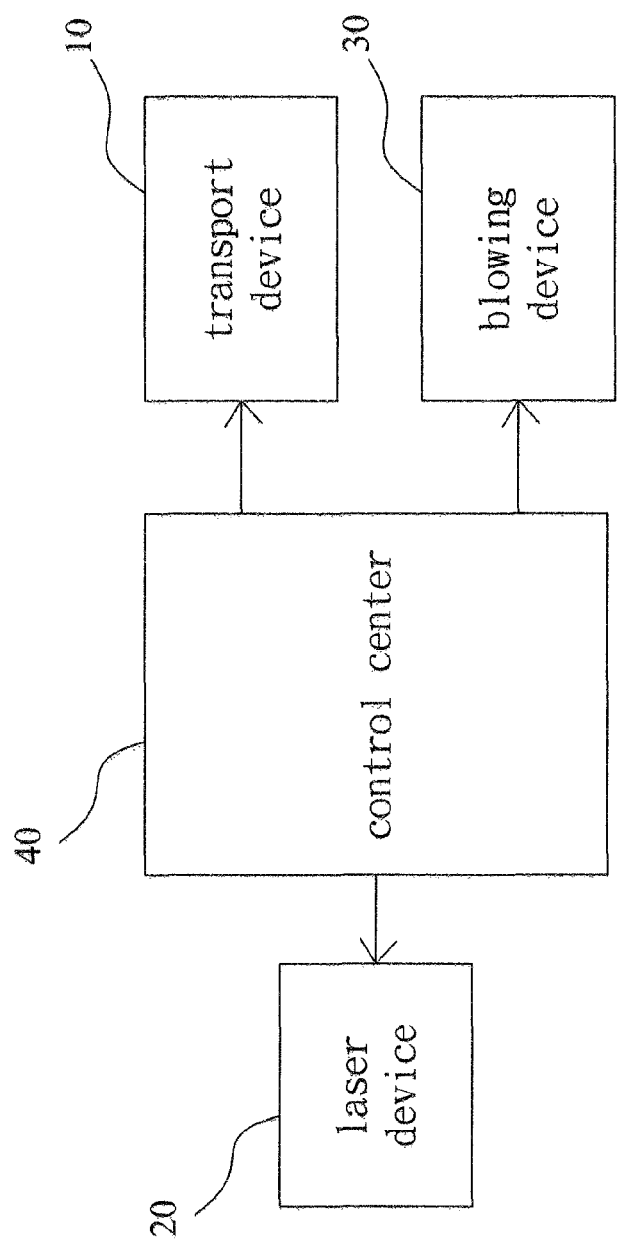
FIG. 3 is a block diagram schematically showing the architecture of a coating layer removing apparatus according to the present invention.

Refer to FIG. 2 and FIG. 3 a diagram and a block diagram respectively schematically showing a coating layer removing apparatus and the architecture thereof according to one embodiment of the present invention. The coating layer removing apparatus of the present invention comprises a transport device 10, a laser device 20, a blowing device 30 and a control center 40. The transport device 10 is used to displace a positive or negative electrode plate, which will be referred to as the electrode plate 200 thereinafter. The transport device 10 includes a releasing wheel unit 11, a winding wheel unit 12, a tension wheel unit 13 and two fixing wheel units 14. One end of the electrode plate 200 is fixed to the releasing wheel unit 11, and then inserted through the tension wheel unit 13 and the fixing wheel units 14, and finally fixed to the winding wheel unit 12. The releasing wheel unit 11 is a passive element, and the winding wheel unit 12 is an active element. When the winding wheel unit 12 reels up the electrode plate 200 clockwise, the electrode plate 200 moves along the displacement path constructed by the tension wheel unit 13 and the fixing wheel units 14 and drive the releasing wheel unit 11 to rotate clockwise. The position of the tension wheel unit 13 can be adjusted to modify the tension of the electrode plate 200.

Figure 4:
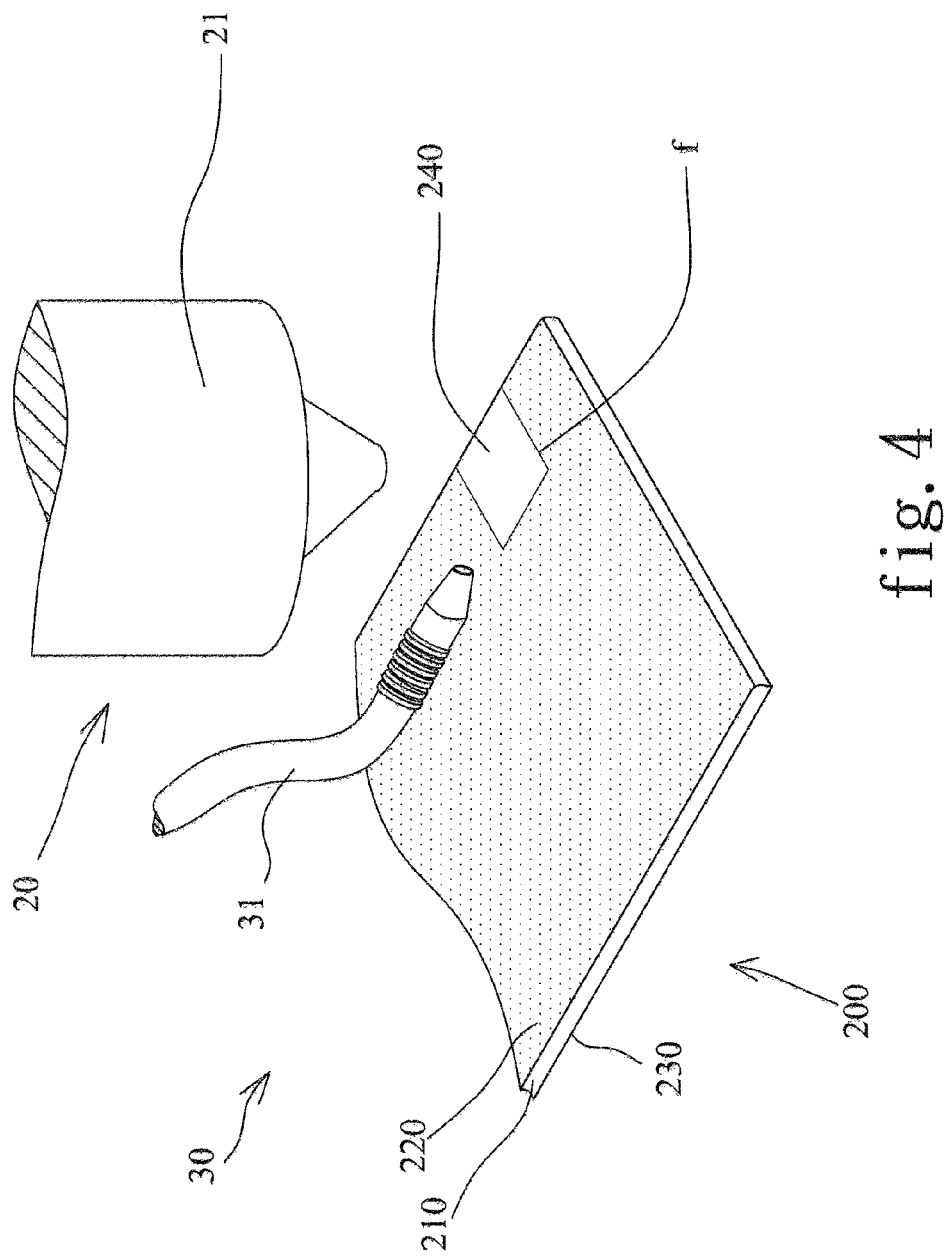
FIG. 4 is a diagram schematically showing that a laser device projects a marking frame onto an electrode plate according to the present invention.

Refer to FIG. 4. The laser device 20 is arranged at a predetermined position above the displacement path of the electrode plate 200. The laser device 20 includes a light-guiding and focusing unit 21 and a laser head 22. In the laser carving technology, the light-guiding and focusing unit 21 projects a marking frame f onto the surface of an object, and the laser head 22 emits a laser beam to hit the marking frame f and remove the material inside the marking frame f. The laser head 22 may be a carbon dioxide laser gun, a YAG laser gun or an excimer laser gun. The electrode plate 200 of a common lithium battery includes a substrate 210 and two coating layers 220 and 230 respectively on the upper and lower surfaces of the electrode plate 200. The materials of the substrate 210 and the coating layers 220 and 230 vary with the polarity of the electrode plate 200. In this embodiment, the laser beam hits the coating layer 220 on the upper surface of the electrode plate 200; the area marked by the marking frame f is an exposed area 240 to be joined with an electric-conduction tab.

The structures of the positive and negative electrode plates, the laser carving technology and the marking technology are all prior arts. In the specification, the present invention does not exclude any of other laser guns that can remove the coating layer. The substitutions of laser guns belong to the equivalent modifications or variations according to the spirit of the present invention and should be included within the scope of the present invention.

The blowing device 30 includes an air compressor (not shown in the drawing) and a nozzle 31. The nozzle 31 is arranged beside the laser head 22 and aimed at the area marked by the marking frame f. The air compressor supplies an inert gas to the nozzle 31 to blow the area marked by the marking frame f. The inert gas can lower the temperature of the area heated by the laser beam. The control center 40 electrically connects with the transport device 10, laser device 20 and blowing device 30. The control center 40 has a keyboard 41 and a screen 42. Via the keyboard 41, the user inputs data to control the start, pause, stop, rotation speed of the winding wheel unit 12, and the count, time interval and penetration depths of the laser beams.

Figure 5:
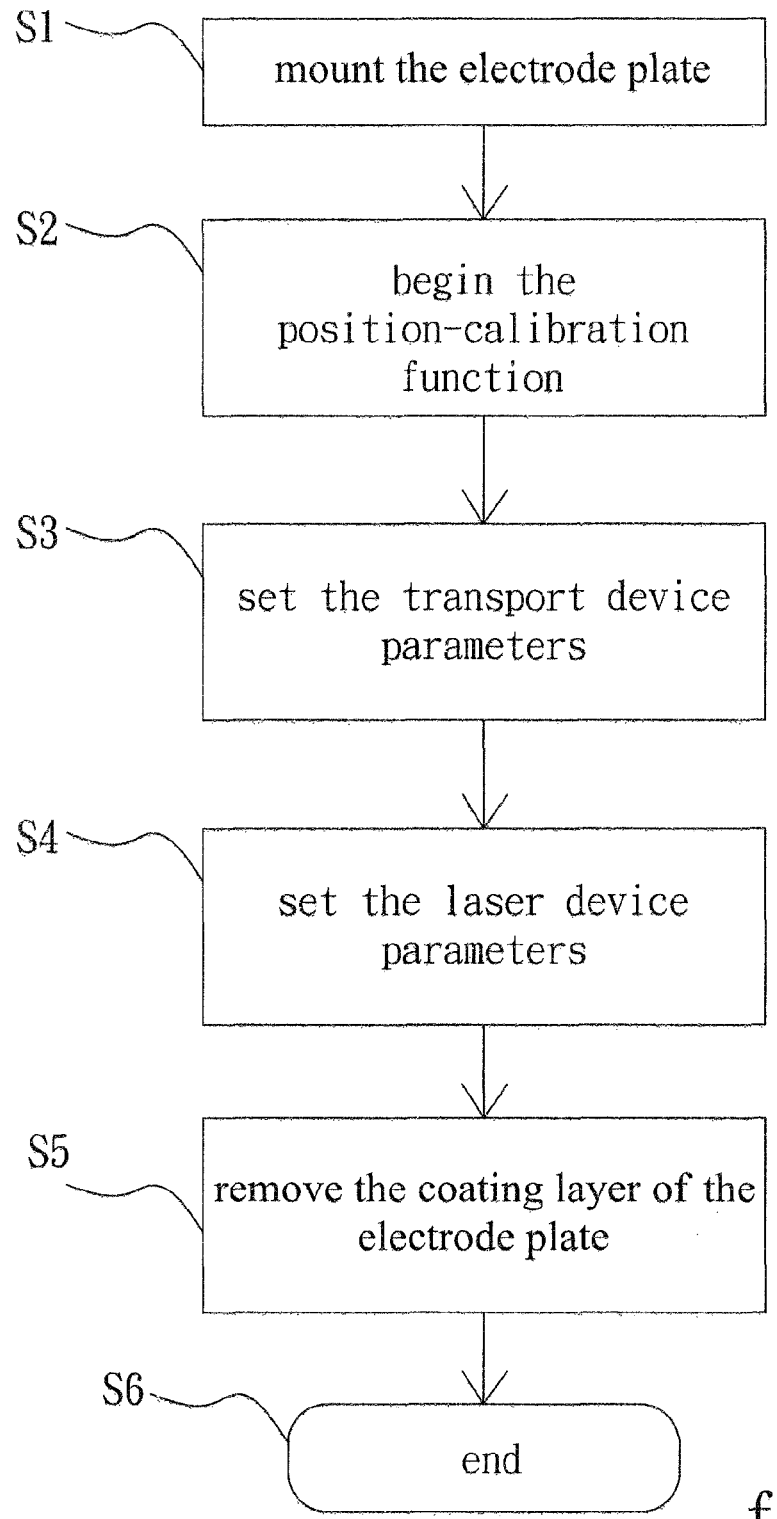
FIG. 5 is a flowchart of a coating layer removing method according to the present invention.

Below is described the method to implement the device of the present invention to effectively remove the coating layer 220 of the positive or negative electrode plate 200. Refer to FIG. 5. In Step S1, the worker mounts the electrode plate 200 on the releasing wheel unit 11, guides one end of the electrode plate 200 to pass through the tension wheel unit 13 and the fixing wheel units 14, and winds the electrode plate 200 on the winding wheel unit 12. Next, in Step S2, the worker starts the control center 40 and begins the position-calibration function to locate the electrode plate 200 at an initial position.

Next, in Step S3, the worker programs the displacement speed, the spacing between two pause areas, and the pause time via the keyboard 41 and checks the input data via the screen 42. The control center 40 is programmed to start the laser device 20 to emit the laser beam when the movement of the electrode plate 200 pauses. Next, in Step S4, the worker determines the size of the marking frame f of the light-guiding and focusing unit 21. The electrode plate 200 is very thin. The counts of laser beams and the penetration depth of each laser beam for a single exposed area 240 is carefully selected, so that the laser energy is applied to each exposed area 240 in several cycles by small amounts lest the substrate 210 be damaged. The penetration depth of the last laser beam for each exposed area 240 is set to be the smallest so that the action of the last laser beam has a polishing effect to remove the residual coating layer 220. The start timing and the end timing of the blowing device 30 are also programmed in Step S4.

After all the necessary settings have been done, the worker starts the coating layer removing apparatus of the present invention to automatically remove the coating layer 220 of the electrode plate in Step S5. Step S1 and Step S2 are not necessarily undertaken in the beginning. Step S1 and Step S2 may be also executed after Step S3 and Step S4. The sequence exchange mentioned above would not influence the result of the present invention.

Once the coating layer removing apparatus is started, the winding wheel unit 12 drives the electrode plate 200 to move for a short distance to reach the predetermined position. Next, the light-guiding and focusing unit 21 of the laser device 20 projects a making frame f onto the surface of the electrode plate 200 and focuses a laser beam onto the marking frame f. According to the count and penetration depths set in Step S4, the laser device 20 gradually reduces the thickness of the coating layer 220 cycle after cycle. At the same time, the nozzle 31 of the blowing device 30 sends out an inert gas to reduce the temperature of the electrode plate 200 lest overheat distort the electrode plate 200. After an exposed area 240 is done, the control center 40 controls the winding wheel unit 12 to rotate again to displace the electrode plate 200 for a given distance so that the laser device 20 can undertake a next cycle of coating layer removing operation. The steps of displacing the electrode plate, applying laser beams and supplying inert gas will be performed repeatedly until a predetermined quantity of exposed areas 240 is obtained. The removal of the coating layer 230 on the opposite surface is realized via merely re-mounting the electrode plate 200 of the winding wheel unit 12 to the releasing wheel unit 11 without undertaking Step S3 and Step S4 any more. Therefore, the present invention can reduce the damage rate of the electrode plate 200 and promote the quality of the products.

Figure 6:
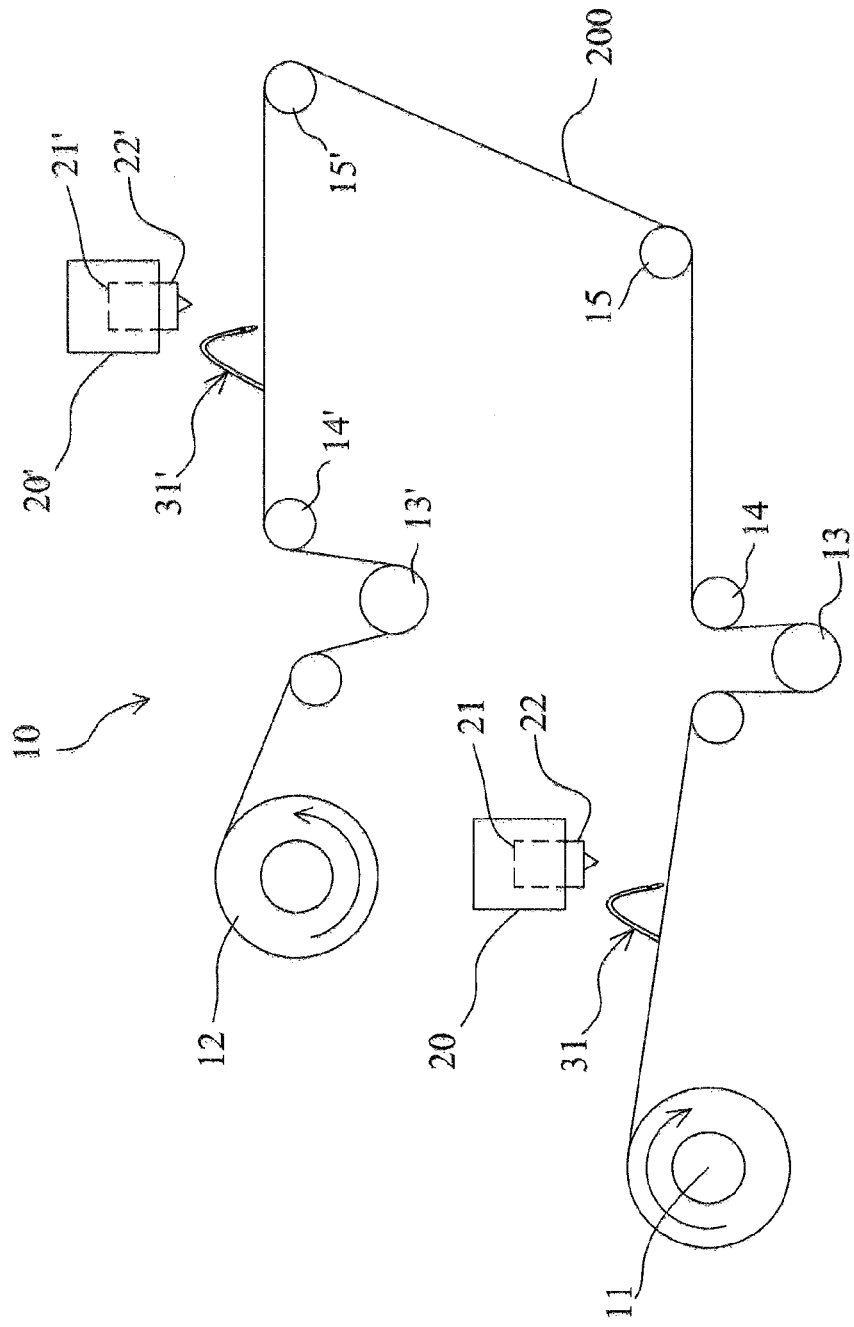
FIG. 6 is a diagram schematically showing a coating layer removing apparatus according to another embodiment of the present invention.

According to the description of the device and method of the present invention, the persons skilled in the art can achieve higher production efficiency via varying the numbers of the tension wheel units, the fixing wheel units and the laser devices. Refer to FIG. 6 a diagram schematically showing a coating layer removing apparatus according to another embodiment of the present invention. In this embodiment, the transport device 10 includes a releasing wheel unit 11, a winding wheel unit 12, two tension wheel units 13 and 13', a plurality of fixing wheel units 14 and 14', and two diverting wheel units 15 and 15'. After passing through the diverting wheel units 15 and 15', the upper surface and the lower surface of the electrode plate 200 is top down and bottom up. In other words, the orientation of the upper coating layer 220 and the lower coating layer 230 are exchanged. Thus, the original upper coating layer 220 becomes downward, and the original lower coating layer 230 becomes upward. In this embodiment, the laser head 22 of the laser device 20 is faced to the coating layer 220, and the laser head 22' of the laser device 20' is faced to the coating layer 230. Two nozzles 31 and 31' are respectively arranged beside the laser devices 20 and 20'. Thereby, the exposed areas 240 on two sides of the electrode plate 200 are simultaneously completed in a single process.

Figure 7:
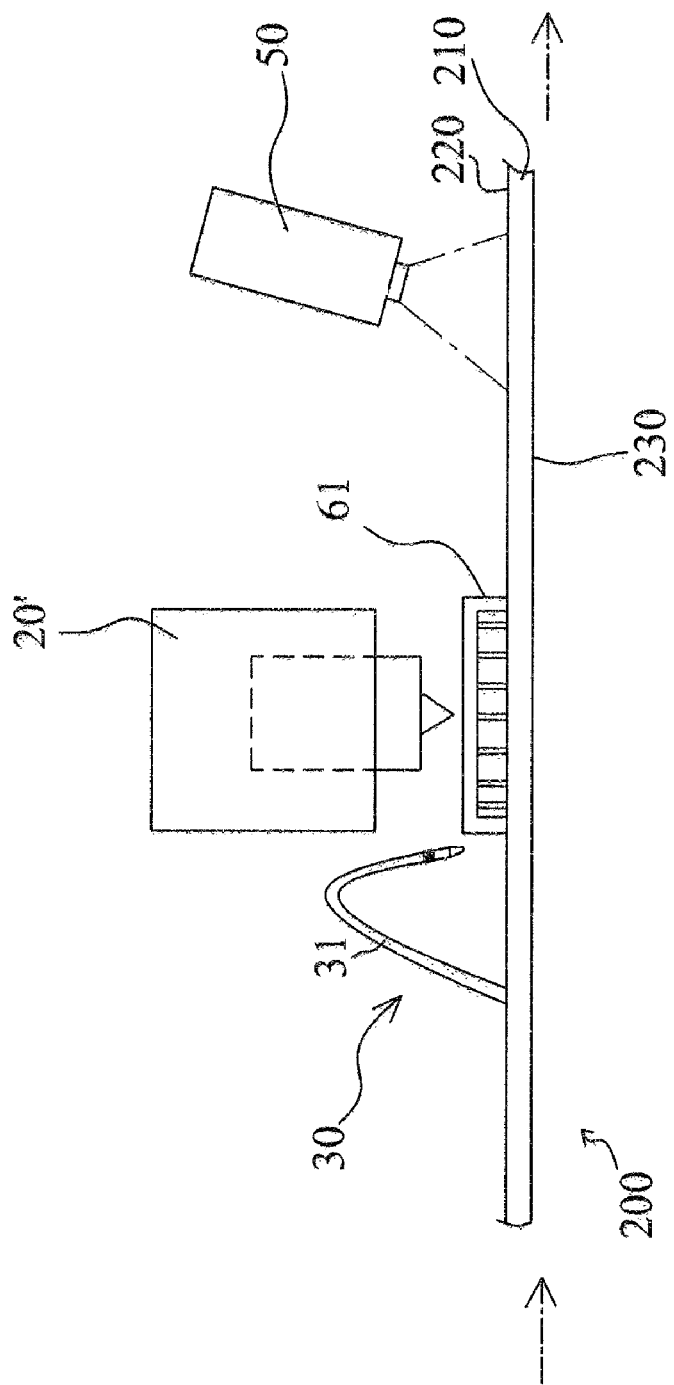
FIG. 7 is a diagram schematically showing a coating layer removing apparatus according to yet another embodiment of the present invention.

Refer to FIG. 7 for yet another embodiment of the present invention. In this embodiment, an image capture device 50, such as CCD (Charge Coupled Device), is arranged beside the laser device 20 to capture the image of the exposed area 240 to improve the soldering quality of the electrode plate 200 and the electric-conduction tab. The image capture device 50 is electrically connected with the control center 40, and the control center 40 presents the image on the screen 42. Thus, the worker can perform quality control via the screen 42. Alternatively, the control center 40 examines the color difference of the image with an image processing technology. When the color difference exceeds a standard, the control center 40 initiates a warning action. The warning action includes triggering an alarm light or a buzzer to remind the workers of the quality problem. Besides, a suction nozzle 61 is arranged beside the area marked by the marking frame f to remove the debris generated in removing the coating layers 220 and 230 lest the debris affect the quality of soldering. Thereby, the fabrication quality of lithium batteries is further promoted.

Figure 8:
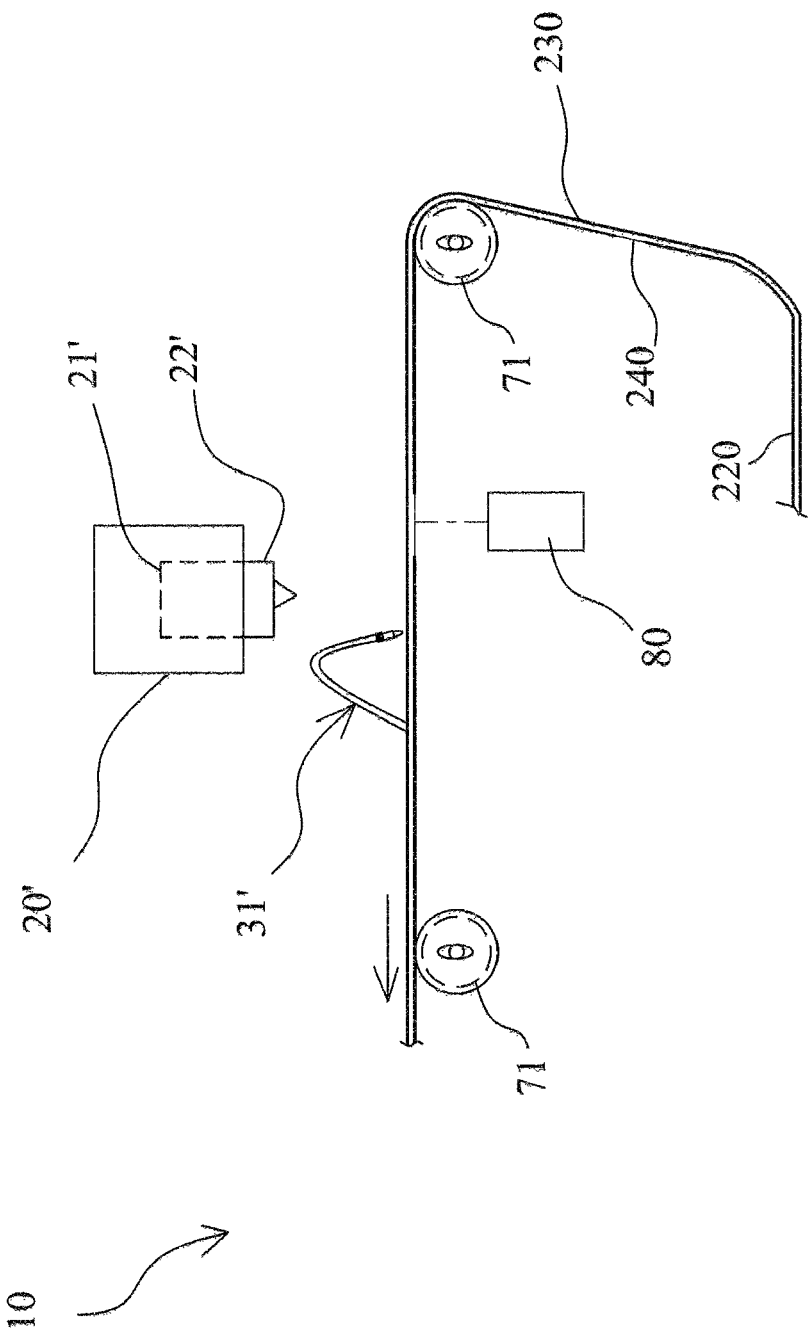
FIG. 8 is a diagram schematically showing a coating layer removing apparatus according to a further embodiment of the present invention.

Refer to FIG. 8 for a further embodiment of the present invention. In this embodiment, the electrode plate 200 passes a positioning axis 71 of an edge-positioning module and diverts downward. A photosensor 80 is arranged between the positioning axis 71 and the laser head 22' and electrically connected to the control center 40. When the exposed area 240 of the coating layer 220 passes the photosensor 80, the photosensor 80 generates a positional signal. The control center 40 receives the positional signal and determines the timing of triggering the laser device 20'. Then, the laser device 20' emits laser beams to remove a portion of the coating layer 230. The edge-positioning module is a positioning device usually used in the transport device of plate-like materials. In the present invention, the edge-positioning module is used to guarantee that the consistency of the positions of the exposed areas 240. In the present invention, a camera and an image processing technology may replace the photosensor 80 to generate the positional signal.

In conclusion, the present invention adopts laser devices to remove the coating layers to prevent from damaging the substrates of the positive and negative electrode plates and promote the quality and yield rate of the electrode roll. Further, the present invention realizes fabrication automation, reduces the manpower and cost for the manufacturers, and promotes the productivity of lithium batteries.

The embodiments described above are to demonstrate the present invention to make the persons skilled in the art to understand, make and use the present invention. However, the embodiments are not intended to limit the scope of the present invention. Any equivalent modification or variation according to the spirit of the present invention is to be also included within the scope of the present invention, which is based on the claims stated below.

What is claimed is:

1. A coating layer removing apparatus, for removing a portion of a coating layer on an electrode plate to form an exposed area revealing a substrate of said electrode plate, and comprising:
    a transport device displacing said electrode plate;
    at least one laser device each including a laser head arranged above a displacement path of said electrode plate and generating a laser beam, wherein said laser head emits said laser beam to hit and partially penetrate said electrode plate and form said exposed area on said electrode plate, whereby the coating layer within the exposed area is scraped away by laser to provide open access to a surface of the substrate thereat; and
    a control center electrically connected to said transport device and said laser device, controlling said transport device to displace said electrode plate at a predetermined speed, and controlling said laser device to emit said laser beam.

2. The coating layer removing apparatus according to claim 1 further comprising an image capture device, which is arranged beside said laser device and electrically connected to said control center, and which captures an image of said electrode plate and transmits said image to said control center, wherein said control center performs image processing on said image to obtain color difference of said exposed area and evaluate a result of removing said coating layer.

3. The coating layer removing apparatus according to claim 2, wherein when said color difference exceeds a standard, said control center initiates a warning action, and said warning action includes triggering an alarm light or a buzzer.

4. The coating layer removing apparatus according to claim 1, wherein said transport device further comprises at least one releasing wheel unit, at least one tension wheel unit, a plurality of fixing wheel units, and at least one winding wheel unit, and wherein two ends of said electrode plate are respectively attached to said releasing wheel unit and said winding wheel unit, and wherein said electrode plate passes through said tension wheel unit and said fixing wheel units, and wherein said winding wheel unit and said releasing wheel unit rotate at a same direction to displace said electrode plate, and wherein said tension wheel unit is adjusted to modify tension of said electrode plate.

5. The coating layer removing apparatus according to claim 1, wherein said transport device further comprises at least one diverting wheel unit, and wherein when said electrode plate passes said diverting wheel unit, orientations of an upper surface and a lower surface of said electrode plate are exchanged, and wherein one said laser device is arranged in a position where said upper surface faces upward, and wherein another said laser device is arranged in a position where said lower surface faces upward.

6. The coating layer removing apparatus according to claim 1 further comprising a blowing device, which has a nozzle aimed at said exposed area formed by said laser beam and blowing an inert gas to said electrode plate.

7. The coating layer removing apparatus according to claim 1, wherein said laser device further comprises a light-guiding and focusing unit that projects a marking frame onto said electrode plate, and said laser beam hits an area encircled by said marking frame.

8. The coating layer removing apparatus according to claim 7, wherein a size of said marking frame is set with said control center to determine a size of said exposed area.

9. The coating layer removing apparatus according to claim 1, wherein said control center further comprises a keyboard and a screen, and wherein said keyboard is used to input a speed at which said transport device displaces said electrode plate, a count of said laser beams, a time interval between two said laser beams, penetration depths of said laser beams, and wherein said screen presents said speed, said count, said time interval and said penetration depths.

10. The coating layer removing apparatus according to claim 1 further comprising a dust-removing device electrically connected to said control center, wherein said dust-removing device has a suction nozzle arranged near a region hit by said laser beam to concurrently remove debris as portions of the outer coating layer are scraped away by laser.

11. A coating layer removing method, for removing a portion of a coating layer on an electrode plate to form an exposed area revealing a substrate of said electrode plate, and which comprises:

Step (A): displacing an electrode plate;
Step (B): controlling a speed of displacing said electrode plate; and
Step (C): using a laser beam to hit and partially penetrate said electrode plate and form said exposed area on said electrode plate, whereby the coating layer within the exposed area is scraped away by laser to provide open access to a surface of the substrate thereat.

12. The coating layer removing method according to claim 11, wherein in said Step (C), an inert gas is released to blow a region hit by said laser beam to reduce temperature of said electrode plate.

13. The coating layer removing method according to claim 11, wherein after said Step (C) is undertaken a Step (D): capturing an image of said exposed area and performing image processing on said image to obtain color difference of said exposed area; then is undertaken a Step (E): when said color difference exceeds a standard, initiating a warning action to trigger an alarm light or a buzzer.

14. The coating layer removing method according to claim 11, wherein in said Step (C), a suction nozzle is arranged beside a region hit by said laser beam, and wherein said suction nozzle is controlled by a dust-removing device to concurrently collect debris on said electrode plate while said laser beam is in operation.

15. The coating layer removing method according to claim 12, wherein in said Step (C), a marking frame is projected onto said electrode plate, and then said laser beam is used to remove the coating layer within said marking frame.

16. The coating layer removing method according to claim 15, wherein in said Step (C), a size of said marking frame is set.

* * * * *